US006367322B1

(12) United States Patent
Rump

(10) Patent No.: US 6,367,322 B1
(45) Date of Patent: Apr. 9, 2002

(54) METHODS AND APPARATUS FOR DETERMINING SENSITIVITY OF TRIGGERING OF A MOTOR VEHICLE AUTOMATIC BRAKING OPERATION

(75) Inventor: Siegfried Rump, Weinstadt (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 08/423,512

(22) Filed: Apr. 17, 1995

(30) Foreign Application Priority Data

Apr. 15, 1994 (DE) .......................................... 44 13 172

(51) Int. Cl.[7] .............................. B60T 7/06; G01L 5/28

(52) U.S. Cl. ........................................................ 73/121

(58) Field of Search .......................... 73/121, 129, 132; 303/113.4, 144, 155

(56) References Cited

U.S. PATENT DOCUMENTS

| | | | | |
|---|---|---|---|---|
| 4,610,484 A | * | 9/1986 | Amberg et al. | 303/113.4 |
| 4,818,036 A | * | 4/1989 | Reinecke | 303/155 |
| 5,158,343 A | * | 10/1992 | Reichelt et al. | 303/113.4 |
| 5,230,549 A | * | 7/1993 | Osada et al. | 303/113.4 |
| 5,350,224 A | * | 9/1994 | Nell et al. | 303/113.4 |
| 5,350,225 A | * | 9/1994 | Steiner et al. | 303/113.4 |
| 5,427,442 A | * | 6/1995 | Heibel | 303/113.4 |
| 5,441,335 A | * | 8/1995 | Stumpe et al. | 303/113.4 |
| 5,445,444 A | * | 8/1995 | Rump et al. | 303/113.4 |
| 5,496,099 A | * | 3/1996 | Resch | 303/113.4 |
| 5,505,526 A | * | 4/1996 | Michels | 303/155 |

FOREIGN PATENT DOCUMENTS

| | | |
|---|---|---|
| DE | 40 28 290 C1 | 1/1992 |
| GB | 2 280 718 A | 2/1995 |
| GB | 2 283 546 A | 5/1995 |
| JP | 1-204855 | 8/1989 |
| JP | 4-121260 | 4/1992 |
| JP | 4-135958 | 5/1992 |
| JP | 4-176763 | 6/1992 |
| JP | 4-197861 | 7/1992 |
| JP | 5-58237 | 3/1993 |
| JP | 5-229413 | 9/1993 |
| JP | 5-262219 | 10/1993 |
| JP | 5-270384 | 10/1993 |
| JP | 5-294218 | 11/1993 |
| JP | 5-301567 | 11/1993 |
| JP | 6-1222 | 1/1994 |

* cited by examiner

*Primary Examiner*—Eric S. McCall
(74) *Attorney, Agent, or Firm*—Crowell & Moring LLP

(57) ABSTRACT

Methods are disclosed for determining, in dependence on the driving situation, the sensitivity of the triggering of an automatic braking operation for a motor vehicle in which an automatic braking operation is triggered during a braking maneuver when the speed of actuation of the brake pedal exceeds a predetermined threshold value. The automatic braking operation consists of the production of a brake pressure higher than that corresponding to the position of the brake pedal. The sensitivity of the triggering of the automatic braking operation is adapted to the driving situation existing at the moment of the braking operation in question, and permits better differentiation between emergency braking and target braking. Variation of the sensitivity of the triggering in dependence on the nature, or the occurrence in terms of time, of the actuation of the pedal by the driver is provided by taking into account only the braking manoeuvre in question and/or the pedal actuations preceding this braking maneuver.

18 Claims, 2 Drawing Sheets

E-GAS
BA
22
21
23
10
12
16
17
15
13
11
14
14

METHODS AND APPARATUS FOR DETERMINING SENSITIVITY OF TRIGGERING OF A MOTOR VEHICLE AUTOMATIC BRAKING OPERATION

BACKGROUND AND SUMMARY OF THE INVENTION

The present invention relates to methods and apparatus for determining, in dependence on the driving situation, the sensitivity of the triggering of an automatic braking operation for a motor vehicle.

An automatic braking operation is described, for example, in DE 40 28 290 C1 where the triggering of an automatic braking operation in a motor vehicle occurs during a braking manoeuvre when the speed of actuation of the brake pedal exceeds a predetermined threshold value. The automatic braking operation consists in producing a brake pressure higher than that corresponding to the position of the brake pedal.

Unpublished German patent application DE-P. 43 25 940.5 discloses the adaptation of the sensitivity of the triggering of the automatic brake operation to vehicle speed and brake pedal position. These adaptations mainly take into account the customary behavior of drivers and are independent of the momentary traffic situation. To vary the threshold value for the speed of actuation, the factors used are obtained from a characteristic diagram in dependence on vehicle speed and brake pedal position.

Adaptation to the individually varying behavior of different drivers by way of characteristic diagram regulation of the triggering criterion in dependence on previous braking manoeuvres, without triggering of the automatic braking operation, is in addition described in unpublished German patent application DE-P. 43 38 068.9. On the basis of the actuation of the pedal in target braking, in which the driver actuates the brake pedal such that the vehicle comes to rest in a position predetermined by the driver, the sensitivity of the triggering of the automatic braking operation, in which the driver wishes to halt the vehicle as quickly as possible, is adapted to the driver.

An object of the present invention is to adapt the sensitivity of triggering of the automatic braking operation to the driving situation existing at the moment of the braking manoeuvre in question and thus to permit better differentiation between emergency braking, in which the automatic braking operation is to be triggered, and target braking in which the triggering of the automatic braking operation is not desired.

This object has been achieved according to the present invention by variation of the sensitivity of the triggering in dependence on the nature, or the time-wise occurrence, of the actuation of the pedal by the driver. In particular, use is made for this purpose of the time interval between two events defined by predetermined pedal positions or pedal actuations. Only the braking manoeuvre in question and/or the pedal actuations preceding this braking manoeuvre are taken into account for this purpose. The expression "braking manoeuvre" used herein covers all processes in the time period between the displacement of the brake pedal from its unactuated position of rest and the subsequent return of the brake pedal to this position of rest which can, for example, be detected from the switching position of the brake light switch.

Various independent methods are contemplated for the adaptation of the triggering sensitivity of the automatic braking operation. Each of these three methods can therefore be applied by itself or in combination with another or both of the other methods for the adaptation of the triggering sensitivity.

A first of the methods according to the present invention is based on evaluation of the speed of return of the accelerator pedal. In emergency situations, the first reaction is a sudden return movement of the accelerator pedal because the driver reduces the driving power of the vehicle. At high return speeds of the accelerator pedal, the threshold value for the speed of actuation of the brake pedal is lowered. A slow, progressive reduction of the driving power of the vehicle, however, rather leads to the inference or conclusion that the driver is in control of the driving situation. Through the raising of the threshold value, the triggering of the automatic braking operation is therefore shifted into the range of higher brake pedal actuation speeds.

In a second method according to the present invention, the waiting time between the reaching of the idling position of the accelerator pedal and the actuation of the brake is measured. An actuation of the brake can be detected from the switching position of the brake light switch. If there is a long period of time between these two events it can be concluded that the vehicle is running down to a standstill under control, and the triggering threshold for the automatic braking operation can be raised.

In a third method according to the present invention, the actuation time between the commencement of the brake actuation, detected by the switching of the brake light switch, and the exceeding of a predetermined speed threshold value for the speed of actuation of the brake pedal is measured. A long period of time then leads to the conclusion that the driver is ready to brake, because he has already placed his foot on the brake pedal, but still delays application of the brake. "Sporting" drivers tend to operate the brake vigorously after a waiting phase of this kind, although target braking is effected. The triggering threshold is therefore raised with increasing time between the events.

The adaptation of the triggering sensitivity to the driving situation is effected by factors which are derived from a characteristic diagram and by which a predetermined threshold value for the speed of actuation of the brake pedal, or a threshold value, derived from a predetermined threshold value, for the speed of actuation of the brake pedal is multiplied.

BRIEF DESCRIPTION OF THE DRAWINGS

These and other objects, features and advantages of the present invention will become more readily apparent from the following detailed description when taken in conjunction with the accompanying drawings wherein.

DETAILED DESCRIPTION OF THE DRAWINGS

Figure 1:
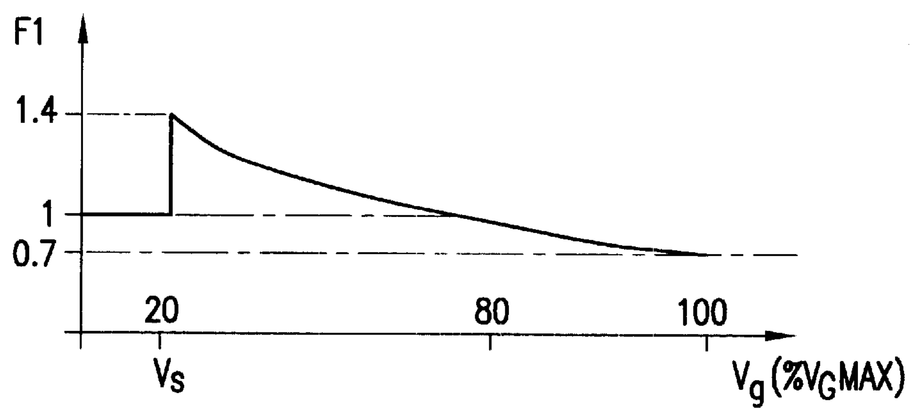
FIGS. 1 to 3 are characteristic curves for determining the sensitivity of triggering in accordance with the different methods of the present invention.
Figure 2:
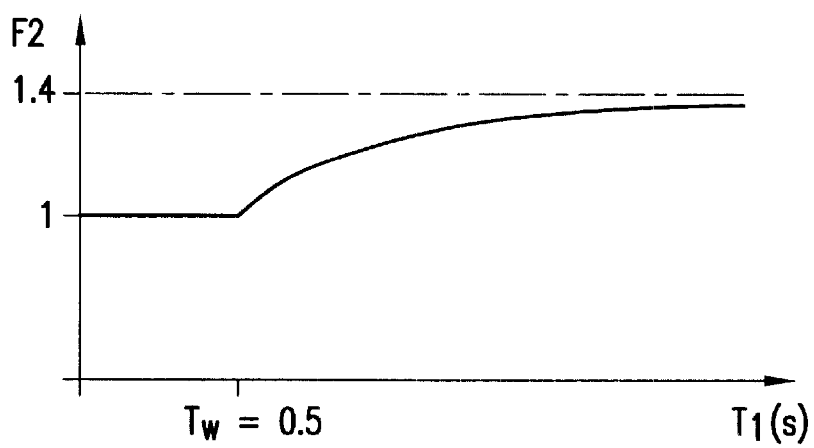
Figure 3:
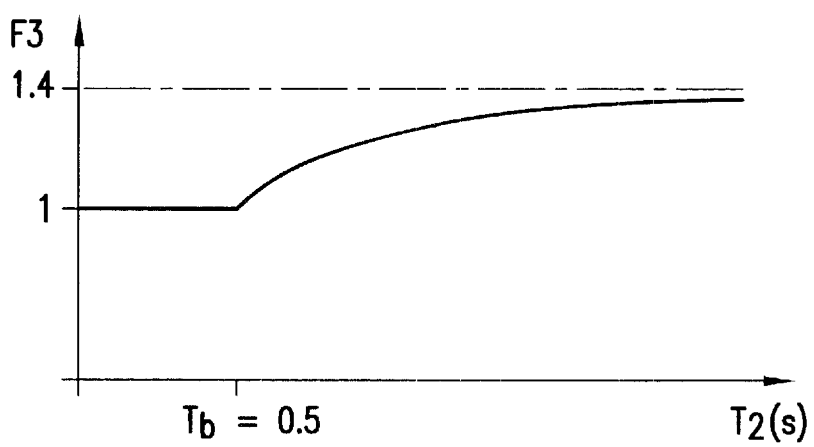

FIGS. 1 to 3 show the characteristic curves for determining the factors F1, F2 and F3. When the threshold value, Seff, of at least one of these factors is exceeded, the automatic braking operation is triggered. The threshold value, Seff, is determined in accordance with the equation $$Seff=F1\cdot F2\cdot F3\cdot Sf,$$

where Sf is a fixed predetermined threshold value.

The values of the factors F1, F2, F3 which are indicated by the characteristic curves shown in FIGS. 1 to 3 are to be regarded as guide values. They also depend, inter alia, on the choice of the fixed threshold value, Sf, and on the pedal forces to be applied by the driver to actuate the pedal, and are to be individually adapted to conditions in the vehicle. The abscissa values in the figures are likewise to be regarded as guide values which are to be adapted to conditions in the vehicle.

The shape of the characteristic curves shown in FIGS. 1 to 3 is likewise to be regarded as exemplary. Except for the characteristics described below, such as limit values and maxima, the shape of the curves can be adapted to specific requirements. In the adaptation of the shape of the curve the driving behavior of a multiplicity of drivers and driving styles is, for example, to be taken into account. Driving trials and simulations of different driving situations are therefore, for example, a suitable way of adapting the characteristic curves to conditions in the vehicle.

FIG. 1 shows the characteristic curve for the factor, F1, which is determined in dependence on the speed of return, Vg, of the accelerator pedal. The speed of return of the accelerator pedal is indicated as a percentage of the maximum possible speed of return, Vgmax, of the accelerator pedal. Below a limit value, Vs, of approximately Vs=20% Vgmax for the speed of return, Vg, of the accelerator pedal the factor, F1, is equal to 1, and the triggering is not effected. At the value, Vs, which corresponds to a slow return of the accelerator pedal, a controlled reduction of vehicle speed is deduced. Emergency braking is not deemed highly probable. The factor, F1, is therefore raised to a maximum. The effective threshold value, Seff, is thus raised and triggering of the automatic braking operation is therefore made difficult. The maximum is adjoined by a range of usual speeds of return, Vg, of the accelerator pedal, in which the factor, F1, falls until at Vg≈80%, for example, it reaches the value "1" again.

As the speed of return, Vg, of the accelerator pedal continues to rise, the factor, F1, drops to its minimum of, for example, 0.7. These pedal return speeds, Vg, correspond to a rapid closing of the throttle down to the abrupt removal of the foot from the accelerator pedal. This style of pedal actuation also occurs in emergency situations, so that the sensitivity of the triggering of the automatic braking operation is reduced.

In FIG. 2 the factor, F2, is shown plotted against the waiting time, T1, between the reaching of the idling position of the accelerator pedal and the actuation of the brake. A waiting time of less than a waiting time threshold value Tw=0.5 s is in this case regarded as usual and therefore has no influence on the effective threshold value Seff. The factor, F2, has the value "1". In the case of a waiting time, T1, above the waiting time threshold value, Tw, that is T1>Tw is interpreted as an intentional delay on the part of the driver before actuating the brake and points to a driving state under the control of the driver, to the vehicle being allowed to run to a halt or to the adaptation of speed to that of a preceding vehicle. Emergency braking becomes more improbable with increasing waiting time, T1. The sensitivity of triggering of the automatic braking operation is increased through the raising of the effective threshold value, Seff. For this purpose the factor, F2, becomes greater with increasing waiting time, T1, until it reaches a maximum. The value of the maximum is, for example, 1.4.

In FIG. 3, the factor, F3, is plotted against the actuation time, T2, between the actuation of the brake and the exceeding of a threshold value, Sv, for the speed of actuation of the brake pedal. The threshold value, Sv, for the speed of actuation of the brake pedal can here be given as a fixed proportion of either the fixed threshold value, Sf, or of the effective threshold value, Seff, at the time in question. The given proportion amounts, for example, to between 70 and 100%. If the threshold value, Sv, is equal to the effective threshold value, Seff, the factor, F3, is determined after the effective threshold value, Seff, has been exceeded and before the automatic braking operation has been triggered. From the product $$Seff'=F3*Seff$$

the new effective threshold value, Seff', is then determined. As soon as the speed of actuation of the brake pedal also exceeds this effective threshold value, Seff', the automatic braking operation is triggered. The effective threshold value, Seff', is in this arrangement determined only once during each braking manoeuvre.

The shape of the curve for the factor, F3, corresponds to the shape of the curve for the factor, F2. Below an actuating time threshold value, Tb, for example with Tb equal to 0.5 s, F3 is equal to 1, and the sensitivity of triggering is not affected. An actuation time of this kind is considered necessary or usual for achieving the threshold value, Sv.

A dilatory actuation of the brake pedal, characterized by an actuation time T2>Tb, points to a braking manoeuvre carried out by the driver as target braking. Emergency braking is considered scarcely probable in this situation. As the actuation time increases further the factor, F3, therefore rises until it reaches a limit value. The sensitivity of triggering for the automatic braking operation is thereby increased.

In addition, the adaptations according to the present invention of the triggering sensitivity can in a simple manner be combined with other adaptations of the triggering sensitivity, for example, those of the above-mentioned unpublished German patent Applications DE-P. 43 25 940.5 and DE-P. 43 38 068.9.

Figure 4:
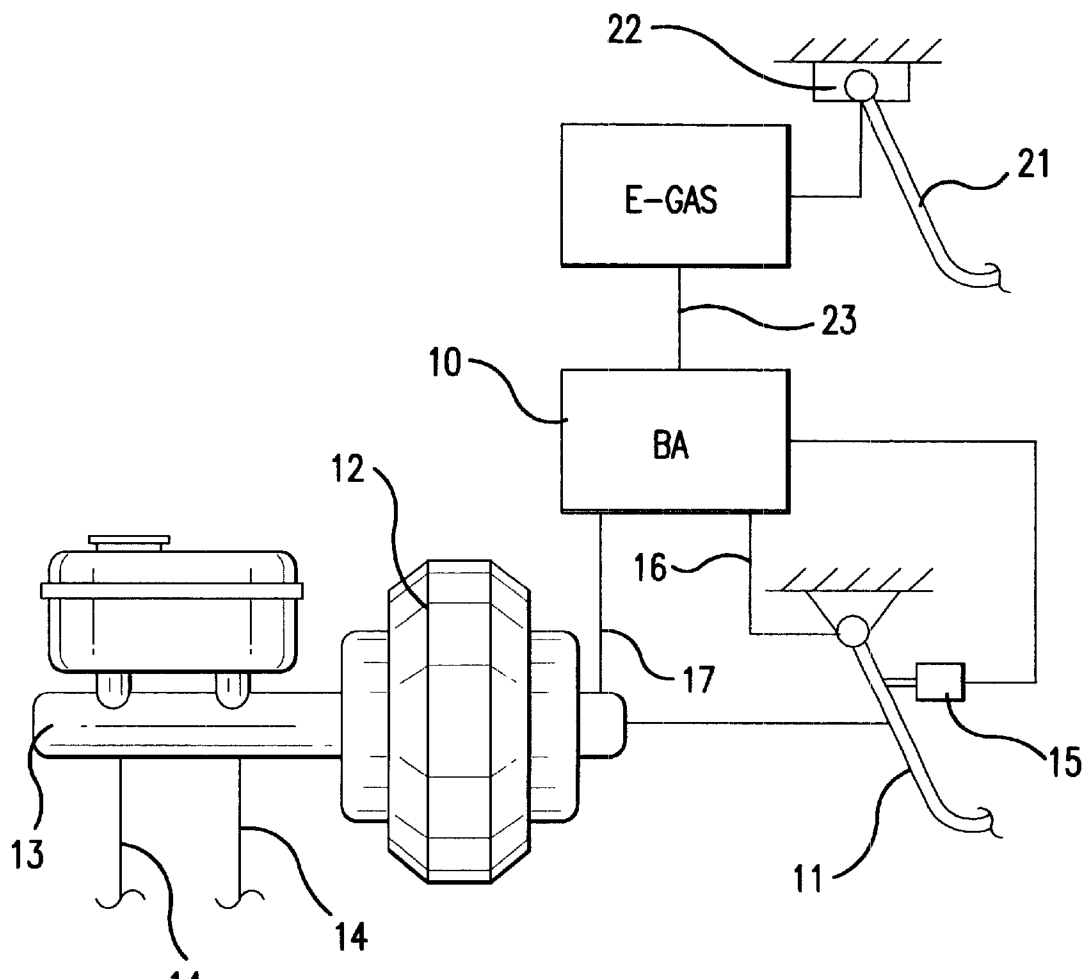
FIG. 4 shows an arrangement employing the methods of the present invention.

FIG. 4 is a schematic diagram of an arrangement for applying the methods according to the present invention. The brake pressure transmitted by the main brake lines 14 to the wheel brakes (not shown) is generated in the main brake cylinder 13. The brake force required for this purpose is produced in the servo unit 12 from the actuating force applied by the driver to the brake pedal 11. The signal of the brake light switch 15 and, via the sensor line 16, a signal corresponding to the distance travelled by the brake pedal are fed to the control apparatus 10 for the automatic braking operation. Furthermore, a signal corresponding to the position of the accelerator pedal 21 and picked up by the sensor 22 is also fed via the data line or data bus 23. The control apparatus 10 can ascertain therefrom the speed of return, Vg, of the accelerator pedal and also the moment in time when the idling position is reached.

In the control apparatus 10 for the automatic braking operation the effective threshold value, Seff, is determined from the fixed threshold value, Sf, and the speed of actuation of the brake pedal is calculated from the time derivative of the position of the brake pedal 11. If the automatic braking operation is triggered, a brake force greater than that corresponding to the position of the brake pedal is produced. For this purpose, for example, the control apparatus 10 effects, via the control line 17, the admission of air to the chamber on the brake pedal side in the vacuum servo unit 12. This gives rise to the immediate operation of the brake servo unit.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A method of determining triggering sensitivity of an automatic operation in a motor vehicle in dependence on a driving situation, comprising the steps of (a) taking as a criterion for triggering of the automatic braking operation when a braking manoeuvre is carried out in excess of a threshold value of a speed of brake pedal actuation;

(b) automatically building up a brake pressure higher than that result from a position of the brake pedal after the triggering of the automatic braking operation;

(c) presenting a fixed threshold value for brake pedal actuation speed;

(d) ascertaining a least one factor dependent on the driving situation in time-based dependence on at least one of the brake pedal actuation during a braking manoeuvre and on pedal actuation preceding the braking manoeuvre; and (e) determining a new threshold value as a product of the ascertained at least one factor dependent on the driving situation and the fixed threshold value to differentiate between emergency braking requiring the automatic braking operation and target braking which does not require the automatic braking operation.

2. The method according to claim 1, wherein one factor dependent on the driving situation is determined in dependence on speed of return of an accelerator pedal in a pedal release manoeuvre immediately preceding the braking manoeuvre.

3. The method according to claim 1, wherein the factor dependent on the driving situation is determined in dependence on a waiting time between reaching an accelerator pedal idling position and the brake pedal.

4. The method according to claim 1, wherein the factor dependent on the driving situation is determined in dependence on an actuation time between the brake pedal actuation and exceeding of a speed threshold value for the brake pedal actuation.

5. The method according to claim 4, wherein the speed threshold value is a predetermined proportion of the fixed threshold value.

6. The method according to claim 5, wherein the predetermined proportion is between 70% and 100%.

7. The method according to claim 1, wherein a value range of the factors is between 0.7 and 1.4.

8. The method according to claim 7, wherein the one factor dependent on the driving situation is determined in dependence on speed of return of an accelerator pedal in a pedal release manoeuvre immediately preceding the braking manoeuvre.

9. The method according to claim 8, wherein the factor dependent on the driving situation is further determined in dependence on a waiting time between reaching an accelerator pedal idling position and the brake pedal.

10. The method according to claim 9, wherein the factor dependent on the driving situation is determined in dependence on an actuation time between the brake pedal actuation and exceeding of a speed threshold value for the brake pedal actuation.

11. The method according to claim 2, wherein a value of the one factor below a return threshold value is equal to 1, reaches a maximum at the return threshold value, decreases with increasing return speed of the accelerator pedal, and reaches a minimum at the maximum return speed of the accelerator pedal.

12. The method according to claim 3, wherein a value of the factor below a waiting time threshold value is equal to 1 and above the waiting time threshold value rises to a maximum.

13. The method according to claim 4, wherein a value of the factor below an actuation time threshold value is equal to 1 and above the actuation time threshold value rises to a maximum.

14. The method according to claim 11, wherein the factor dependent on the driving situation is further determined in dependence on a waiting time between reaching an accelerator pedal idling position and the brake pedal.

15. The method according to claim 14, wherein a value of the factor below a waiting time threshold value is equal to 1 and above the waiting time threshold value rises to a maximum.

16. The method according to claim 15, wherein the factor dependent on the driving situation is also determined in dependence on an actuation time between the brake pedal actuation and exceeding of a speed threshold value for the brake pedal actuation.

17. The method according to claim 16, wherein a value of the factor below an actuation time threshold value is equal to 1 and above the actuation time threshold value rises to a maximum.

18. A system for changing triggering sensitivity of an automatic breaking operation in a motor vehicle in dependence upon a driving situation, comprising means for generating brake pressure;

a brake light switch;

a control apparatus operatively associated with the brake pressure generating means and with the brake light switch to provide a signal representative of a distance travelled by a brake pedal for the automatic braking operation;

means for generating a signal representative of a position of an accelerator pedal operatively associated with the control apparatus such that the control apparatus is able to determine a speed of return of the accelerator pedal and a moment when idling position of the accelerator pedal has been reached; and the control apparatus being further configured to determine an effective threshold value as a product of at least one factor dependent on the driving situation and a fixed threshold value preset for brake pedal actuation speed in which the factors include brake pedal actuation during a braking manoeuvre and pedal actuation proceeding the braking manoeuver;

whereby triggering of the automatic braking operation based upon the effective threshold value generates via the brake pressure generating means a brake force greater than that force corresponding to the brake pedal position.

* * * * *